United States Patent
Yoon et al.

(10) Patent No.: US 7,251,533 B2
(45) Date of Patent: Jul. 31, 2007

(54) METHOD FOR CONTROLLING HOME AUTOMATION SYSTEM

(75) Inventors: Hong Shik Yoon, Changwon-shi (KR); Seung Myun Baek, Changwon-shi (KR); Koon Seok Lee, Changwon-shi (KR); Hwan Jong Choi, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 10/506,084

(22) PCT Filed: Apr. 10, 2002

(86) PCT No.: PCT/KR02/00649

§ 371 (c)(1),
(2), (4) Date: Aug. 31, 2004

(87) PCT Pub. No.: WO03/085895

PCT Pub. Date: Oct. 16, 2003

(65) Prior Publication Data

US 2005/0177254 A1 Aug. 11, 2005

(51) Int. Cl.
*G05B 11/01* (2006.01)
*G05B 15/00* (2006.01)
*G05B 23/02* (2006.01)
*G06F 3/00* (2006.01)
*G06F 9/00* (2006.01)
*G06F 17/00* (2006.01)

(52) U.S. Cl. .......................... 700/17; 700/83; 340/3.1; 715/771; 715/970; 715/760

(58) Field of Classification Search .................. 700/17, 700/83, 9; 340/3.1, 3.71, 3.9; 715/740, 715/760, 771, 840, 970, 700, 733–734; 702/188
See application file for complete search history.

(56) References Cited

U.S. PATENT DOCUMENTS 6,195,694 B1  2/2001  Chen et al.

(Continued)

FOREIGN PATENT DOCUMENTS

CN      1250567 A      4/2000

(Continued)

OTHER PUBLICATIONS

Kolberg, M., Feature Interactions in Services for Internet Personal Appliances, IEEE Int'l Conference on Communications, Apr. 28-May 2, 2002, pp. 2613-2618, vol. 4, ISBN 0-7803-7400-2.

(Continued)

*Primary Examiner*—Ronald D Hartman, Jr.
(74) *Attorney, Agent, or Firm*—McKenna Long & Aldridge LLP

(57) ABSTRACT

A method for controlling a home automation system is disclosed, in which a PC for controlling web sites, electric home appliances, and communication between the web sites and the electric home appliances is provided. The method includes a step for trying to communicate with web sites or electric home appliances by using a predetermined program, a step for displaying a web page or a local page according to the communication try result; a step for displaying a corresponding web page or a local page according to the number of connected electric home appliances; and a step for controlling a corresponding appliance by inputting a controlling button of the displayed page.

7 Claims, 3 Drawing Sheets

U.S. PATENT DOCUMENTS

| | | |
|---|---|---|
| 6,218,931 B1 * | 4/2001 | Asghar et al. ............... 370/479 |
| 6,288,716 B1 | 9/2001 | Humpleman et al. |
| 6,374,079 B1 * | 4/2002 | Hsu .......................... 455/11.1 |
| 6,374,296 B1 * | 4/2002 | Lim et al. ................... 709/225 |
| 6,400,103 B1 * | 6/2002 | Adamson .................... 315/292 |
| 6,453,687 B2 * | 9/2002 | Sharood et al. ............... 62/127 |
| 6,553,336 B1 * | 4/2003 | Johnson et al. ............. 702/188 |
| 6,580,950 B1 * | 6/2003 | Johnson et al. .............. 700/17 |
| 6,680,730 B1 * | 1/2004 | Shields et al. ............. 345/169 |
| 6,763,040 B1 * | 7/2004 | Hite et al. .................. 370/522 |
| 2002/0035404 A1 | 3/2002 | Ficco et al. |

FOREIGN PATENT DOCUMENTS

| | | |
|---|---|---|
| JP | 2001-175278 | 6/2000 |
| WO | WO 00/04427 * | 1/2000 |
| WO | WO 01/54406 | 7/2001 |
| WO | WO 01/71489 | 9/2001 |

OTHER PUBLICATIONS

Tak, S.W., et al., Experience with TCP/IP Networking Protocol S/W Over Embedded OS for Network Appliance, Int'l Workshop on Parallel Processing, Sep. 21-24, 1999, pp. 556-561, ISBN 0-7695-0353-5.

Milne, G., et al., Design of High-Integration Microcontroller for Consumer Internet Applications, IEEE Transactions on Consumer Electronics, Jun. 11-13, 1997, pp. 1070-1073, vol. 43, Issue 4, ISSN 0098-3063.

* cited by examiner

METHOD FOR CONTROLLING HOME AUTOMATION SYSTEM

TECHNICAL FIELD

The present invention relates to a home automation system, and more particularly, to a method for controlling the home automation system.

BACKGROUND ART

There are various home appliances being widely used in homes such as a TV, a refrigerator, a washing machine, a microwave oven, and an air-conditioner, each of which has a corresponding control device or a: control part in its body, thereby being controlled by a remote controller or by the operation of its control part.

As the related art home appliances have their own remote controllers, however, the number of remote controllers increases as the number of the home appliances increases. Accordingly, a user comes to have a difficulty in keeping numerous remote controllers and finding the right remote controller each time he/she needs to control a certain home appliance. Also, as each home appliance is separately controlled, to integrate and optimize a home appliance system is not possible.

In addition, because of insufficient memory and functions of a microcomputer of home appliances, to remote control them by loading a protocol such as a transfer control protocol (TCP) in them is not easy.

DISCLOSURE OF THE INVENTION

Accordingly, the present invention is directed to a method for controlling a home automation system that substantially obviates one or more problems due to limitations and disadvantages of the related art.

An object of the present invention is to provide a method for controlling a home automation system by which web surfing and home appliances are controlled at the same time.

Another object of the present invention is to minimize inconveniences caused when a type or a control method of a home appliance is changed.

Additional advantages, objects, and features of the invention will be set forth in part in the description which follows and in part will become apparent to those having a ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a home automation system of the present system includes a website, a PC for attempting communication with the website, and a home appliance being connected to the PC.

A method for controlling a home automation system includes steps of displaying the result of a communication attempt of a PC with a web site and a home appliance when a user drives a predetermined communication program, displaying a guide page of the corresponding appliance according to the communication attempt result: and the number of the home appliances being connected to the PC, and c controlling the corresponding appliance according to a user command which is input as the user inputs a control button on a screen of the corresponding appliance being displayed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
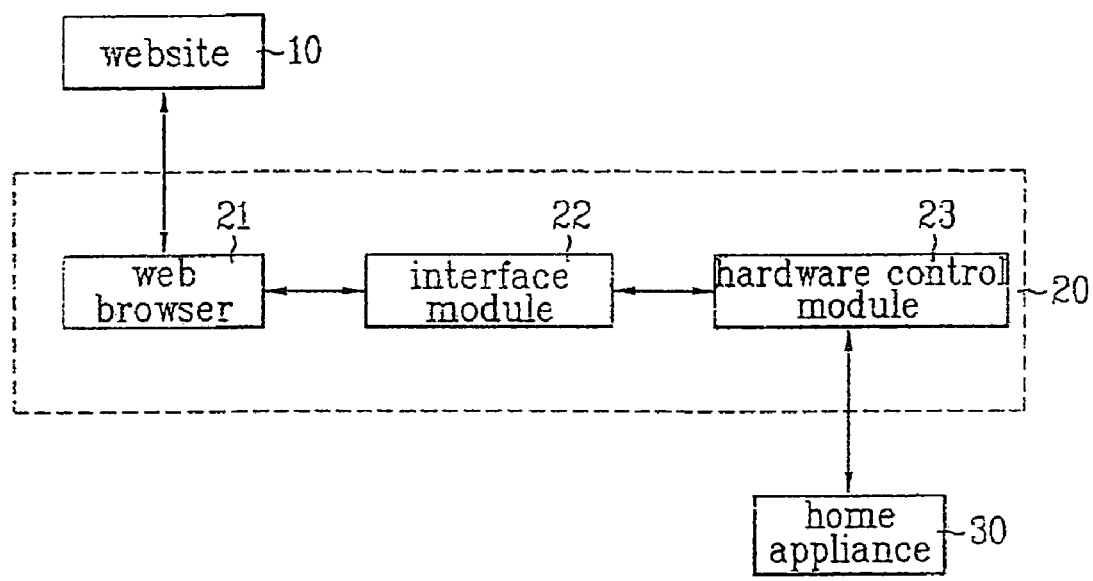
FIG. 1 is a block diagram illustrating a home automation system in accordance with the present invention.
Figure 2A:
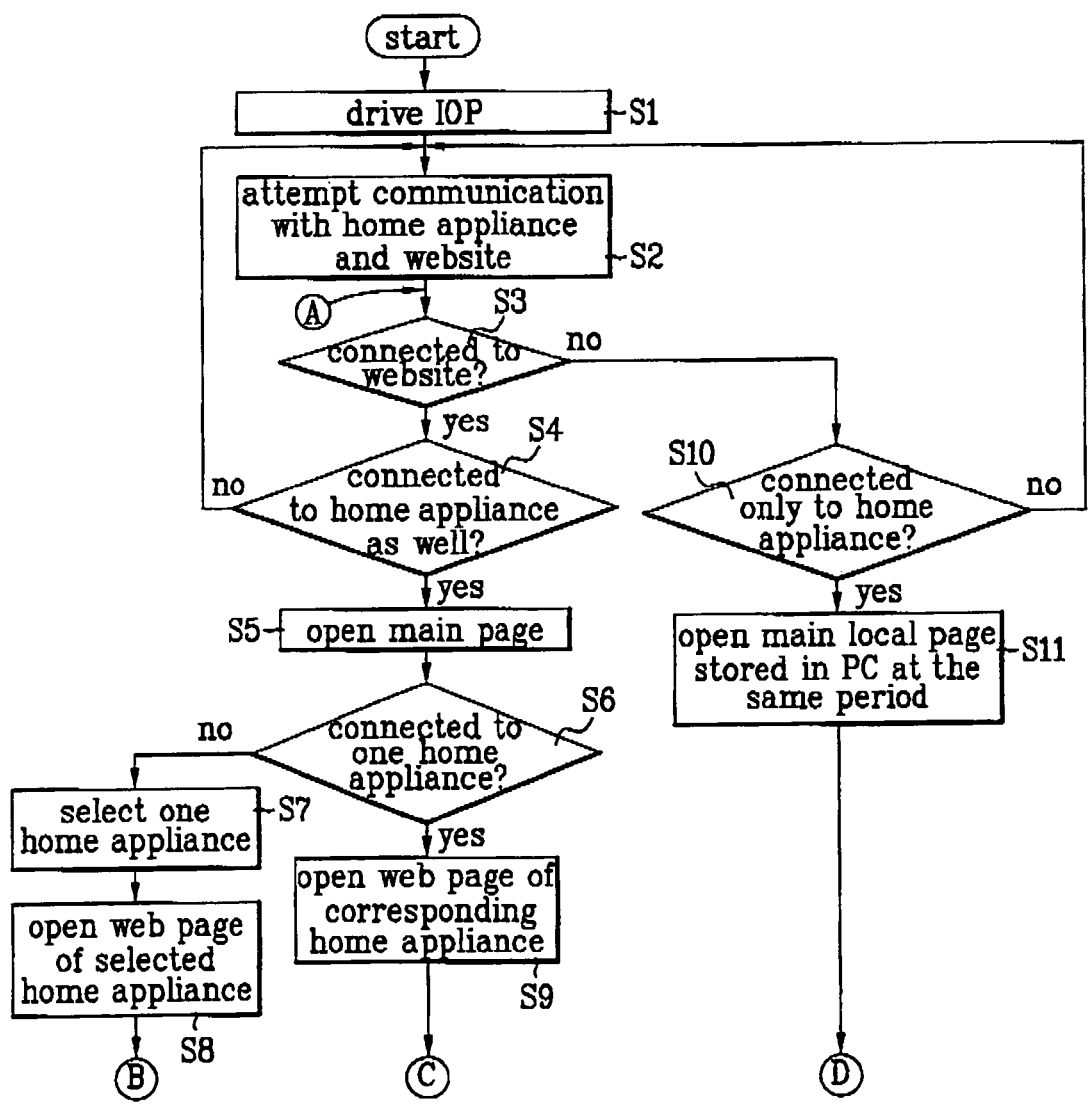
FIG. 2 is a flow chart illustrating a method for controlling a home automation system in accordance with the present invention.
Figure 2B:
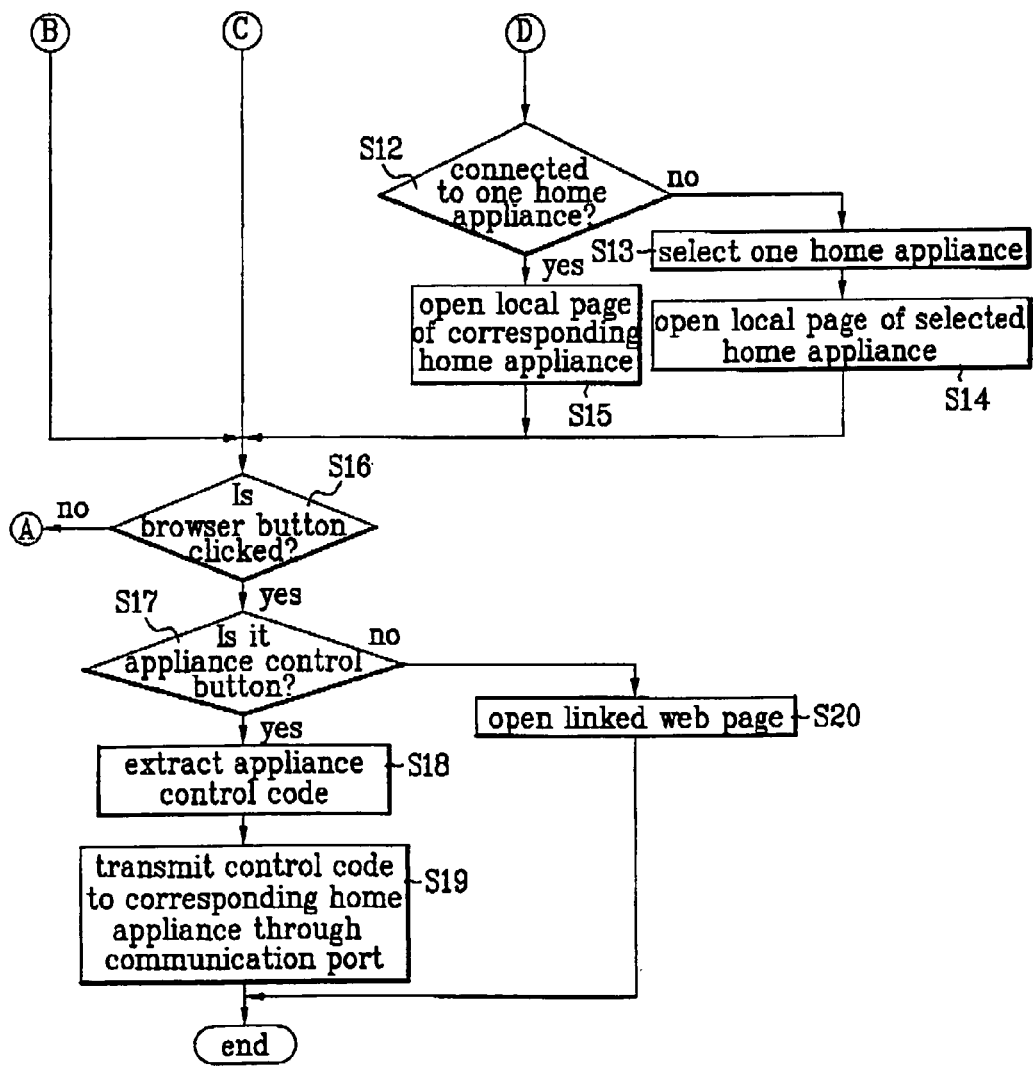

FIG. 1 is a block diagram illustrating a home automation system in accordance with the present invention and FIG. 2 is a flow chart illustrating a method for controlling a home automation system in accordance with the present invention.

As shown in FIG. 1, the home automation system of the present: invention includes a website 10 and a PC 20. The website 10 has data files for controlling a home appliance and files interpretable by a web browser. The PC 20 for controlling the corresponding home appliance 30 has a built-in internet operating program (IOP) for connecting the website 10 with the home appliances 30.

The IOP being built in the PC 20 includes a web browser 21, a hardware control module 23, and an interface module 22. The web browser 21 interprets a web page formed by HTML, JAVA, and the like and displays the web page on a screen. The hardware control module 23 outputs data for controlling the home appliance 30 to the PC through a communication port coupled to the PC or reads signals which are coming to the communication port of the PC 20 from the home appliance 30. The interface module 22 connects data between the web browser 21 and the hardware control module 23.

The home appliance 30 has an RS-232-based communication port to communicate with the PC.

A method for controlling a home automation system having the above-described structure will be described with reference to FIG. 2.

First, a user drives an IOP (S 1).

When it is driven, the IOP attempts communication with a home appliance and a website (S 2).

It is checked whether the IOP is connected to the website after +the attempt of the step 1 (S 3).

If the IOP is successfully connected to the website, it is checked whether the IOP is connected to the home appliance as well (S 4).

If the IOP is also connected to the home appliance successfully, the IOP opens and displays the main web page (S 5).

When the main web page is opened, it is checked whether the IOP is connected to only one home appliance (S 6).

If the IOP is connected to a plurality of home appliances, not just one, in the previous step (S6), the user selects one appliance he/she wants (S 7).

The IOP opens the web pace of the selected home appliance (S 8).

If the IOP is connected to only one home appliance in the step 6, it opens the web page of the corresponding home appliance (S 9).

On the other hand, if the IOP is not connected to the website in the step 3, it is checked whether the IOP is connected to the home appliance (S 10).

As a result of the step 10 if the IOP is connected to the home appliance without being connected to the website, the main local page stored in the PC is opened (S 11).

It is checked whether the IOP is connected to only one home appliance (S 12). If the IOP is connected to a plurality of home appliances, not just one, the user selects one home appliance he/she wants and the local page of the home appliance selected by the user is opened (S 13 and 14).

If the IOP is connected to only one home appliance as a result of the step 12, however, it opens the local page of the corresponding home appliance (S 15).

Then, it is checked whether the user clicked a browser button on the opened web page or local page (S 16).

If the browser button is clicked, it is checked whether the clicked button is an appliance control button (S 17).

As a result of the step 17, if the clicked browser button is the appliance control button, a control code of the corresponding appliance is extracted to be transmitted to the corresponding home appliance through a communication port (S 18).

On the other hand, if the clicked browser button is not the appliance control button, a linked web page is opened (S 20).

As described above, in the method for remote controlling the home automation system, the user drives the IOP to attempt the communication with the website and the home appliance. Then the IOP determines whether to communicate with both the website and home appliance is possible or only to communicate with one of them is possible.

If it is turned out that the IOP can communicate with both the website and the home appliance, the number of home appliances being connected to the IOP is checked. That is, if the IOP is connected to only one home appliance, the main page of the website is opened and the web page of the corresponding home appliance is also opened. On the other hand, if the IOP is connected to a plurality of home appliances, the main page of the website is opened and the web page of the home appliance the user selected among a plurality of the appliances is opened.

In the mean time, if the IOP is connected to only one home appliance without being connected to the website, the local page of the corresponding appliance, which is stored in the PC at the same period, is opened. Also, if the IOP is connected to a plurality of home appliances, the user selects the home appliance he/she wants and the IOP opens the local page of the selected home appliance.

When the user clicks a browser button after the web page or local page is opened, an interface module of the IOP reads the name of the link and extracts a value shown in a control code of the link name. Then, the control code is converted to a data form capable of controlling the home appliance and the data is transmitted to the corresponding home appliance through a predetermined communication line. At this time, as for the communication line, an RS-232c-based communication port is used.

The home appliance being provided with the above data extracts the control code by analyzing the data and controls load of a product.

In the mean time, if the clicked button is linked to a general web page, not to the control button of the home appliance, the corresponding page is opened.

INDUSTRIAL APPLICABILITY

As described above, a method for controlling the home automation system has the following advantages.

First, as home appliances can be controlled on a web browser, web surfing and the home appliances are controlled at the same time.

Second, even though a method for controlling the home appliances or a type of them are changed, a program does not have to be newly installed, as the home appliances can be controlled by downloading alternated matters through the connection with the website. Therefore inconveniences the user may have are minimized.

Third, as the IOP automatically recognizes a product being connected to the PC, the user does not have to be aware of all websites of all products.

While the present invention has been described and illustrated herein with reference to the preferred embodiment thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for controlling a home automation system, the home automation system being provided with a website and a PC for controlling communication with the website and/or at least one home appliance, comprising steps of:

attempting communication with the website and/or the at least one home appliance using a predetermined program;

displaying a web page or a local page of a corresponding home appliance according to a communication attempt result;

displaying a web page or a local page of the corresponding home appliance based on the number of the home appliances that are connected; and controlling the corresponding home appliance according to a command input via an appliance control button on a linked screen associated with the corresponding appliance;

wherein when displaying the web or local pages corresponding to the communication attempt, the corresponding web page is displayed if Internet Operation Program (IOP) built in the PC is connected to both the website and home appliance and the local page stored in the PC is displayed if the IOP is connected only to the home appliance.

2. The method of claim 1, wherein if the number of home appliances connected to the IOP is a predetermined value, the web page or the local page of the corresponding home appliance being displayed according to the communication attempt.

3. The method of claim 2, wherein if the number of the home appliances connected to the IOP is greater than the predetermined value, then a web page or a local page of a selected home appliance is displayed.

4. The method of claim 2, wherein the predetermined number is one.

5. The method of claim 1, wherein said controlling the corresponding home appliance includes:

extracting a control code of the corresponding home appliance when the appliance control button is input; and transmitting the control code to the corresponding home appliance through a communication port upon extracting the control code.

6. The method of claim 5, wherein the communication port is an RS-232C-based port.

7. The method of claim 1, the method for controlling a home automation system further comprises displaying the linked screen if the appliance control button is not activated.

* * * * *